United States Patent
Suzuki

(10) Patent No.: US 10,387,232 B2
(45) Date of Patent: Aug. 20, 2019

(54) IMAGE FORMING APPARATUS, AND RECORDING MEDIUM THEREFOR THAT ENSURE APPARATUS OPERATION WITHOUT SEPARATION OF HDD WHEN PARTIALLY INOPERABLE

(71) Applicant: Kyocera Document Solutions Inc., Osaka (JP)

(72) Inventor: Masahiro Suzuki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 208 days.

(21) Appl. No.: 15/469,584

(22) Filed: Mar. 27, 2017

(65) Prior Publication Data
US 2017/0286203 A1     Oct. 5, 2017

(30) Foreign Application Priority Data
Apr. 3, 2016   (JP) ................. 2016-074812

(51) Int. Cl.
*G06F 11/00*   (2006.01)
*G06F 11/07*   (2006.01)
*G06F 3/06*    (2006.01)
*G06K 15/00*   (2006.01)

(52) U.S. Cl.
CPC ........ *G06F 11/0736* (2013.01); *G06F 3/0619* (2013.01); *G06F 3/0634* (2013.01); *G06F 3/0637* (2013.01); *G06F 3/0644* (2013.01); *G06F 3/0685* (2013.01); *G06F 11/0727* (2013.01); *G06F 11/0733* (2013.01); *G06K 15/408* (2013.01)

(58) Field of Classification Search
CPC .... G06F 11/0733; G06F 3/121; G06F 3/1234; G06K 15/408
See application file for complete search history.

(56) References Cited

U.S. PATENT DOCUMENTS

| 8,427,692 B2* | 4/2013 | Haga .................... G11B 19/041 324/212 |
| 2006/0055971 A1* | 3/2006 | Fukuhara ............ G06F 11/0733 358/1.16 |
| 2006/0080330 A1* | 4/2006 | Sugino ................ G06F 11/0733 |

(Continued)

FOREIGN PATENT DOCUMENTS

JP     2002-149500 A     5/2002

*Primary Examiner* — Philip Guyton
(74) *Attorney, Agent, or Firm* — HEA Law PLLC

(57) ABSTRACT

An image forming apparatus includes an HDD, an HDD confirming unit, a system control unit, and a non-volatile semiconductor storage device. The HDD confirming unit detects a failure of the HDD and, in situations where a failure is detected, executes a confirmation process of detecting any operable portion of the HDD. The non-volatile semiconductor storage device stores system data used for operation of the system control unit. In a failure of the HDD, when the HDD confirming unit does not detect any operable portion, the system control unit separates the HDD from the image forming apparatus and sets the image forming apparatus into a restriction mode. In a failure of the HDD, when the HDD confirming unit detects an operable portion, the system control unit does not separate the HDD from the image forming apparatus and sets the image forming apparatus into a small-capacity mode.

6 Claims, 3 Drawing Sheets

(56) References Cited

U.S. PATENT DOCUMENTS

| | | | | |
|---|---|---|---|---|
| 2012/0297242 A1* | 11/2012 | Osada | ................. | G06F 11/0793 |
| | | | | 714/6.11 |
| 2013/0044355 A1* | 2/2013 | Teshima | .............. | G06F 11/2082 |
| | | | | 358/1.16 |
| 2014/0215277 A1* | 7/2014 | Judd | ................... | G06F 11/2284 |
| | | | | 714/42 |
| 2016/0021276 A1* | 1/2016 | Nitta | .................... | G06K 15/408 |
| | | | | 358/1.14 |
| 2017/0115881 A1* | 4/2017 | Malkin | ................ | G06F 3/0685 |

* cited by examiner

IMAGE FORMING APPARATUS, AND RECORDING MEDIUM THEREFOR THAT ENSURE APPARATUS OPERATION WITHOUT SEPARATION OF HDD WHEN PARTIALLY INOPERABLE

INCORPORATION BY REFERENCE

This application is based upon, and claims the benefit of priority from, corresponding Japanese Patent Application No. 2016-074812 filed in the Japan Patent Office on Apr. 3, 2016, the entire contents of which are incorporated herein by reference.

BACKGROUND

Unless otherwise indicated herein, the description in this section is not prior art to the claims in this application and is not admitted to be prior art by inclusion in this section.

Many of typical image forming apparatuses store data in a hard disk drive (an HDD) as a non-volatile storage device. In this case, when the HDD becomes inoperative, this may cause the image forming apparatus to become unusable.

In this respect, there is proposed a following hard disk drive device. The hard disk drive device gives an instruction of writing or reading to an HDD and, based on its response time, predicts in advance whether or not the HDD is inoperative to separately operate before the HDD becomes inoperative.

SUMMARY

An image forming apparatus according to an aspect of the disclosure includes an HDD, an HDD confirming unit, a system control unit, and a non-volatile semiconductor storage device. The HDD stores user data created by a user. The HDD confirming unit detects a failure of the HDD and, in situations where a failure is detected, executes a confirmation process of detecting any operable portion of the HDD. The non-volatile semiconductor storage device stores system data used for operation of the system control unit. In a failure of the HDD, when the HDD confirming unit does not detect any operable portion, the system control unit separates the HDD from the image forming apparatus and sets the image forming apparatus into a restriction mode. In a failure of the HDD, when the HDD confirming unit detects an operable portion, the system control unit does not separate the HDD from the image forming apparatus and sets the image forming apparatus into a small-capacity mode.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
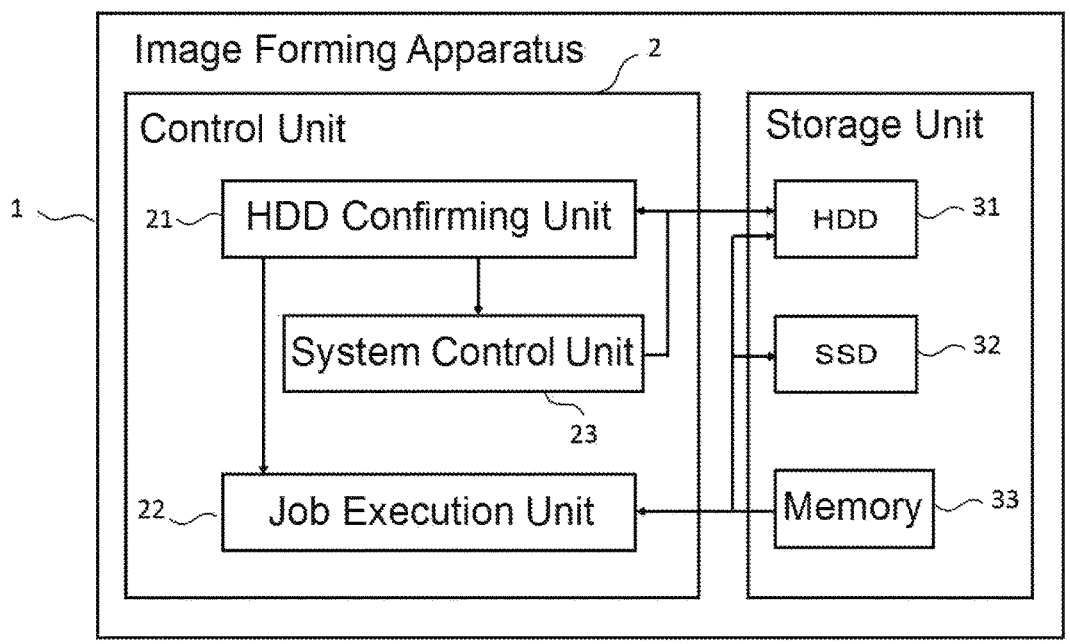
FIG. 1 illustrates a configuration of an image forming apparatus according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 illustrates a configuration of an image forming apparatus 1 according to an embodiment of the disclosure. The image forming apparatus 1 includes a control unit 2 and a storage unit 3.

The control unit 2 includes an HDD confirming unit 21, a job execution unit 22, and a system control unit 23.

The control unit 2 is, for example, a processor, such as a central processing unit (CPU), and an execution of a program causes the control unit 2 to operate as the HDD confirming unit 21, the job execution unit 22, and the system control unit 23.

System data including the program executed by the control unit 2 is stored in an SSD 32. The system data is read from the SSD 32 to be loaded when a system is booted (the image forming apparatus 1 is turned on).

After a failure of an HDD 31 is notified, the HDD confirming unit 21 determines whether the entire HDD 31 is in an inoperative state and a portion of the HDD 31 is operative or not. The detail will be described later.

The job execution unit 22 executes printing, scanning, and other jobs of the image forming apparatus 1. For the execution of the jobs, when the job execution unit 22 stores data (user data) created by a user for the job, for example, an image read from a scanner for copying, the job execution unit 22 stores the data in the HDD 31 insofar as the HDD 31 is usable.

The system control unit 23 separates the HDD 31 from the system, and sets an operation mode of the image forming apparatus 1 to a normal mode, a small-capacity mode, or a restriction mode. The normal mode is a mode where the job is executed after the user data is stored in the HDD 31. The small-capacity mode is a mode where the job is executed after the user data is stored in an operable portion of the HDD 31. The restriction mode is a mode where the job is executed in a state where the HDD 31 is separated from the system. An initial value is set to the normal mode.

The storage unit 3 includes the HDD 31, the SSD 32, and a memory (a volatile storage device) 33.

The HDD 31 has a storage region that stores the user data (used for the job) created by the user.

The SSD 32 has a storage region that stores the system data. The SSD 32 is a non-volatile semiconductor storage device, such as a flash (registered trademark) memory, and has a limitation on the number of writings.

The memory 33 is a volatile semiconductor storage device, such as a random access memory (RAM).

The following describes a procedure of determining that the HDD 31 is inoperative to detect an operable portion when failure information on the HDD 31 is obtained.

Figure 2:
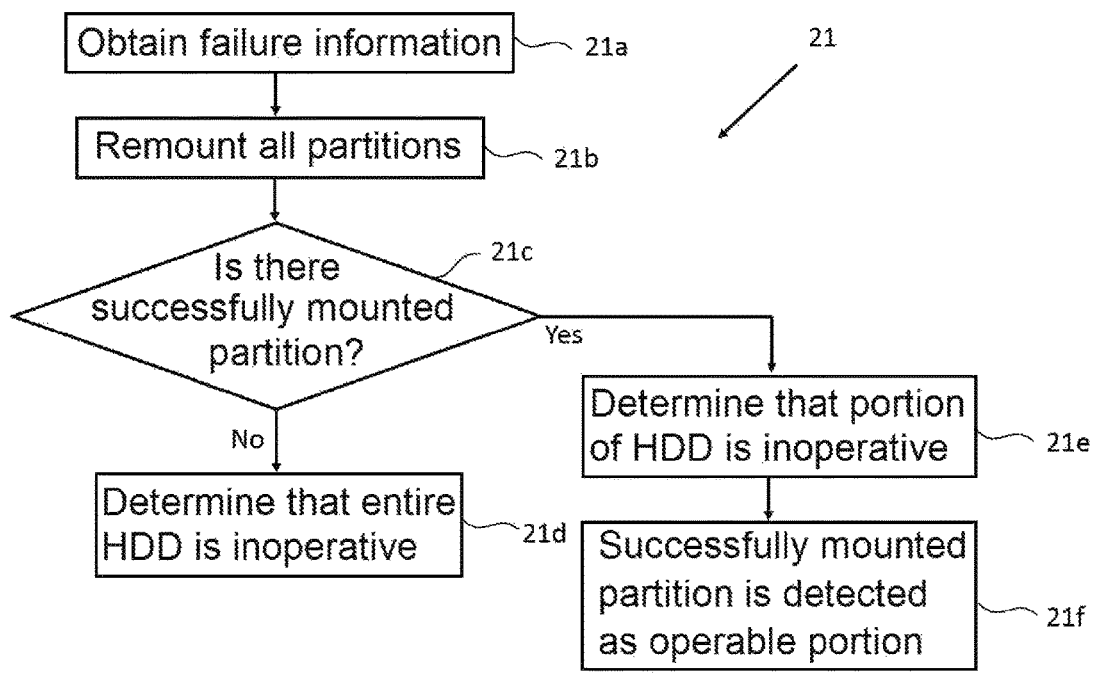
FIG. 2 illustrates a process executed by an HDD confirming unit according to the embodiment.

FIG. 2 illustrates a process executed by the HDD confirming unit 21. The HDD confirming unit 21 operates when the failure information on the HDD 31 is obtained. When the HDD 31 does not respond in the process executed by the control unit 2, the failure information on the HDD 31 is obtained. This causes the control unit 2 to initiate the HDD confirming unit 21.

When the failure information is obtained (Step 21a), the HDD confirming unit 21 remounts all partitions of the HDD 31 (Step 21b). The failure information is obtained by an access (writing or reading) to one partition of the HDD 31. All the partitions may be unusable because hardware of the HDD 31 is broken down, only a portion of the partitions may be unusable because a software failure such as a file system error occurs, or both are possible. In order to determine which occurs, Step 21a is executed. The HDD confirming unit 21 determines whether there is a successfully remounted partition or not (Step 21c).

When there is not any successfully remounted partition, the HDD confirming unit 21 determines that the entire HDD 31 is unusable (Step 21d).

When there is a successfully remounted partition, the HDD confirming unit 21 determines that a portion of the HDD 31 is unusable (Step 21e). Then, the successfully remounted partition is determined as the operable portion (Step 21f).

Next, the following describes processes when the operable portion is detected and is not detected after the HDD 31 is determined to be inoperative.

When the entire HDD 31 is determined to be unusable (when the operable portion is not detected), the system control unit 23 separates the HDD 31 from the system to set the operation mode of the image forming apparatus 1 to the restriction mode. When a portion of the HDD 31 is determined to be unusable (when the operable portion is detected), the system control unit 23 does not separate the HDD 31 from the system to set the operation mode of the image forming apparatus 1 to the small-capacity mode. The memory 33 stores which operation mode is set. At this time, when there is the operable portion, also its information is stored in the memory 33. While the information may be stored in the SSD 32, it is preferred that the information be stored in the memory 33 because of the SSD 32 having a lifespan.

The following describes a process executed by the job execution unit 22.

Figure 3:
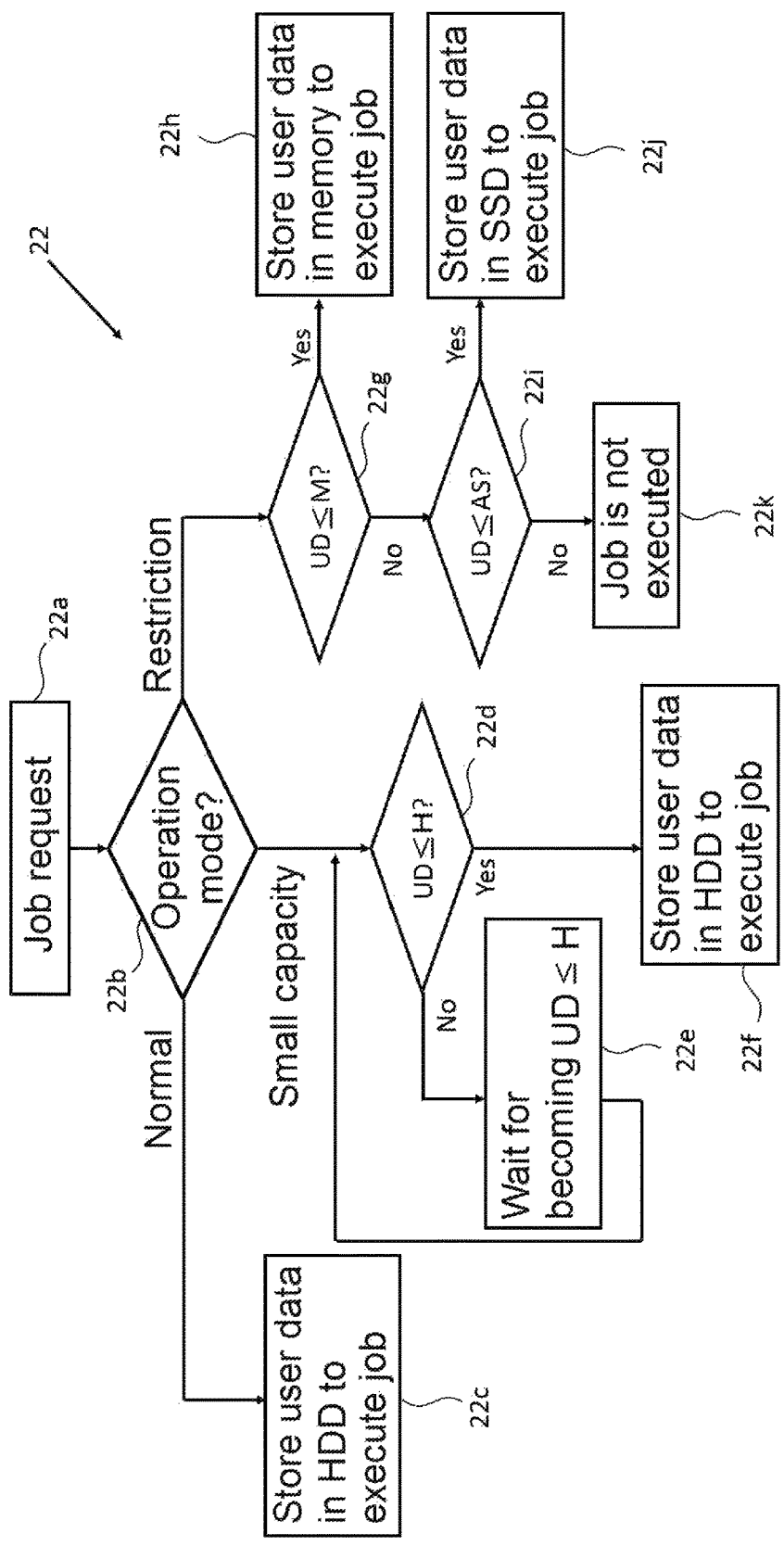
FIG. 3 illustrates a process executed by a job execution unit according to the embodiment.

FIG. 3 illustrates the process executed by the job execution unit 22. When the job execution unit 22 receives a job request (Step 22a), the job execution unit 22 attempts to execute the job. The job execution unit 22 reads the mode from the operation mode information stored in the memory 33 to branch the process based on the operation mode (Step 22b).

During the normal mode, the user data is stored in the HDD 31, and the job is executed without any special operation (Step 22c).

During the small-capacity mode, the job execution unit 22 obtains a size UD of the user data. After that, the job execution unit 22 obtains a free space H of the HDD 31. When the relation between the size UD and the free space H is "UD H" (Step 22d: Yes), the job execution unit 22 stores the user data in the HDD 31 to execute the job (Step 22f).

When the relation between the size UD and the free space H is "UD>H," the job execution unit 22 waits for the relation to become "UD≤H" (Step 22e). A value of H depends on another job executed at the same time, and a termination of the other job increases the value of H. The value of H increases to a capacity of one partition of the HDD 31 at its maximum. It is assumed that the partitions are partitioned in order to execute the job without using a plurality of partitions. The relation between the size UD and the free space H eventually becomes "UD≤H." When the relation between the size UD and the free space H becomes "UD≤H," the user data is then stored in the HDD 31, and the job is executed (Step 22f).

The above-described processes executed in the small-capacity mode may be executed during even the normal mode. However, the value of H may be large during the normal mode. Thus, the relation between the size UD and the free space H is regarded as "UD≤H," and then the process may be executed.

During the restriction mode, the job execution unit 22 obtains the size UD of the user data. After that, the job execution unit 22 obtains a free space M of the memory 33. When the relation between the size UD and the free space M is "UD≤M" (Step 22g: Yes), the job execution unit 22 stores the user data in the memory 33 to execute the job (Step 22h). The reason for obtaining the free space of the memory 33 is that the free space varies according to another job when a plurality of jobs are simultaneously executed. However, in a state where the HDD 31 is separated, the job execution unit 22 executes the jobs one by one, and can employ a value (the value obtained by subtracting a memory capacity used by, for example, the program to execute the job from the entire capacity of the memory 33: a free space of a memory capacity at the time of the execution) of M usable without depending on the other job for all the jobs.

When the relation between the size UD and the free space M is "UD>M," the job execution unit 22 compares an acceptable-writing-data amount AS (corresponding to a free space as a capacity of a free-space region available for the user) of the SSD 32 with the size UD of the user data. After the comparison, when the relation between the size UD and the acceptable-writing-data amount AS is "UD≤AS" (Step 22i: Yes), the job execution unit 22 stores the user data in the SSD 32 to execute the job (Step 22j). Here, "AS" is the largest-writing-data amount per one time and is determined to prevent the reduced lifespan of the SSD 32. However, since the SSD 32 has the limitation on the number of writings, the job execution unit 22 may avoid to execute Steps 22g and 22h to maintain the lifespan of the SSD 32.

When the user data cannot be stored in neither the memory 33 nor the SSD 32, the job execution unit 22 does not execute the job (Step 22k).

While, as described above in detail, the image forming apparatus 1 of the embodiment includes the only one HDD 31, the image forming apparatus 1 uses the system data stored in the SSD 32, which does not require another HDD instead of the separated HDD. Thus, the image forming apparatus 1 operates with the HDD 31 automatically separated from the system when the entire HDD 31 is inoperative. This ensures the requirement for, for example, cost reduction and downsizing. Further, the image forming apparatus 1 operates without separating the HDD 31 from the system when a portion of the HDD 31 is inoperative (when there is the operable portion).

Assume that the jobs are executed one by one also in the restriction mode, where the HDD 31 is separated from the system to operate, and the free space M of the memory 33 is larger than a space for image data of one paper sheet. This ensures reliable executions of basic functions, such as copying and scanning.

The disclosure provides the image forming apparatus including the only one HDD. The image forming apparatus is operable by separating the HDD while the entire HDD is inoperative, and without separating the HDD while a portion of the HDD is inoperative. The disclosure may be employed by many image-forming-apparatus manufacturers and image-forming-apparatus users.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
    an HDD that stores user data created by a user;
    an HDD confirming unit that detects a failure of the HDD and, in situations where a failure is detected, executes a confirmation process of detecting any operable portion of the HDD;
    a system control unit;
    a non-volatile semiconductor storage device that stores system data used for operation of the system control unit; and
    a job execution unit that executes jobs; wherein
    in a failure of the HDD, when the HDD confirming unit does not detect any operable portion, the system control unit separates the HDD from the image forming apparatus and sets the image forming apparatus into a restriction mode,
    in the failure of the HDD, when the HDD confirming unit detects an operable portion, the system control unit does not separate the HDD from the image forming apparatus and sets the image forming apparatus into a small-capacity mode, and
    in the restriction mode, the job execution unit executes other jobs for which the user data used for executing the jobs is storable in the non-volatile semiconductor storage device,
    the image forming apparatus further comprising a volatile storage device; wherein
    in the restriction mode,
        the job execution unit executes the other jobs for which the user data is storable in the volatile storage device, and
        when the user data cannot be stored in the volatile storage device, the job execution unit executes the other jobs for which the user data which is used for the jobs is storable in the non-volatile semiconductor storage device.

2. The image forming apparatus according to claim 1, wherein:
    the HDD is partitioned into two or more partitions; and
    in the confirmation process, the HDD confirming unit tests mounting of each of the partitions and detects a successfully mounted partition as an operable portion.

3. The image forming apparatus according to claim 1, wherein
    in the restriction mode, when a size of the user data is equal to or smaller than an acceptable-writing amount of the non-volatile semiconductor storage device, the job execution unit executes the other jobs and stores the user data in the non-volatile semiconductor storage device, the acceptable-writing amount of the non-volatile semiconductor storage device being a largest-writing-data amount per one time to prevent a decrease in a lifespan of the non-volatile semiconductor storage device.

4. The image forming apparatus according to claim 3, wherein in the small-capacity mode, the job execution unit stores the user data in the operable portion of the HDD.

5. The image forming apparatus according to claim 1, wherein
    in the restriction mode, the job execution unit executes:
        the other jobs and stores the user data in the volatile storage device, when a size of the user data is equal to or smaller than a value obtained by subtracting a memory capacity used by a program to execute the jobs from an entire capacity of the volatile storage device, and
        the other jobs and stores the user data in the non-volatile semiconductor storage device, when (i) the user data cannot be stored in the volatile storage device and (ii) the size of the user data is equal to or smaller than an acceptable-writing amount of the non-volatile semiconductor storage device, the acceptable-writing amount of the non-volatile semiconductor storage device being a largest-writing-data amount per one time to prevent a decrease in a lifespan of the non-volatile semiconductor storage device.

6. A non-transitory computer-readable recording medium storing an image forming program to control a computer of an image forming apparatus including an HDD and a non-volatile semiconductor storage device, the HDD storing user data created by a user, the non-volatile semiconductor storage device storing system data used for operation of the computer, the image forming program causing the computer to function as:
    an HDD confirming unit that detects a failure of the HDD and, in situations where a failure is detected, executes a confirmation process of detecting any operable portion of the HDD;
    a job execution unit that executes jobs; and
    a system control unit; wherein
    in a failure of the HDD, when the HDD confirming unit does not detect any operable portion, the system control unit separates the HDD from the computer and sets the image forming apparatus into a restriction mode,
    in a failure of the HDD, when the HDD confirming unit detects an operable portion, the system control unit does not separate the HDD from the computer and sets the image forming apparatus into a small-capacity mode, and
    in the restriction mode, the job execution unit executes other jobs for which the user data used for executing the jobs is storable in the non-volatile semiconductor storage device,
    the image forming apparatus causing the computer to function as a volatile storage device; wherein
    in the restriction mode,
        the job execution unit executes the other jobs for which the user data is storable in the volatile storage device, and
        when the user data cannot be stored in the volatile storage device, the job execution unit executes the other jobs for which the user data which is used for the jobs is storable in the non-volatile semiconductor storage device.

* * * * *